US011954591B2

(12) United States Patent
Wang et al.

(10) Patent No.: US 11,954,591 B2
(45) Date of Patent: Apr. 9, 2024

(54) PICTURE SET DESCRIPTION GENERATION METHOD AND APPARATUS, AND COMPUTER DEVICE AND STORAGE MEDIUM

(71) Applicant: Tencent Technology (Shenzhen) Company Limited, Shenzhen (CN)

(72) Inventors: Bairui Wang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 910 days.

(21) Appl. No.: 16/990,877

(22) Filed: Aug. 11, 2020

(65) Prior Publication Data
US 2020/0387737 A1    Dec. 10, 2020

Related U.S. Application Data

(63) Continuation of application No. PCT/CN2019/090723, filed on Jun. 11, 2019.

(30) Foreign Application Priority Data

Jul. 5, 2018    (CN) .......................... 201810732095.4

(51) Int. Cl.
*G06N 3/08* (2023.01)
*G06F 16/58* (2019.01)
(Continued)

(52) U.S. Cl.
CPC ............. *G06N 3/08* (2013.01); *G06F 16/583* (2019.01); *G06F 16/5866* (2019.01);
(Continued)

(58) Field of Classification Search
None
See application file for complete search history.

(56) References Cited

U.S. PATENT DOCUMENTS

| 9,858,524 B2 * | 1/2018 | Bengio | .................. G06F 40/40 |
| 2016/0140435 A1 * | 5/2016 | Bengio | .................. G06N 3/045 |
| | | | 382/158 |

(Continued)

FOREIGN PATENT DOCUMENTS

| CN | 102207966 A | 10/2011 |
| CN | 103688240 A | 3/2014 |

(Continued)

OTHER PUBLICATIONS

Wang et al. ("Learning Deep Contextual Attention Network for Narrative Photo Stream Captioning," Thematic Workshops '17: Proceedings of the on Thematic Workshops of ACM Multimedia 2017, Oct. 2017, pp. 271-279 (Year: 2017).*

(Continued)

*Primary Examiner* — Soo Shin
(74) *Attorney, Agent, or Firm* — Morgan, Lewis & Bockius LLP

(57) ABSTRACT

This application provides a method of generating a description for a picture set performed at a computer device, and a storage medium. The method includes: acquiring a picture set to be processed; performing picture feature extraction on each picture in the picture set to acquire a picture feature corresponding to the picture, and forming a picture feature sequence corresponding to the picture set by using the picture features corresponding to the pictures; performing scene feature extraction on a picture feature sub-sequence corresponding to each scene in the picture feature sequence to acquire a scene feature corresponding to the scene, and forming a scene feature sequence corresponding to the picture set by using the scene features corresponding to the (Continued)

scenes; and generating textual description information of the picture set according to the picture feature sequence and the scene feature sequence that correspond to the picture set.

20 Claims, 11 Drawing Sheets

(51) Int. Cl.

| | |
|---|---|
| *G06F 16/583* | (2019.01) |
| *G06F 18/25* | (2023.01) |
| *G06V 10/40* | (2022.01) |
| *G06V 10/764* | (2022.01) |
| *G06V 10/77* | (2022.01) |
| *G06V 10/82* | (2022.01) |
| *G06V 20/00* | (2022.01) |
| *G06V 20/40* | (2022.01) |

(52) U.S. Cl.
CPC ............ *G06F 18/253* (2023.01); *G06V 10/40* (2022.01); *G06V 10/764* (2022.01); *G06V 10/77* (2022.01); *G06V 10/82* (2022.01); *G06V 20/35* (2022.01); *G06V 20/47* (2022.01)

(56) References Cited

U.S. PATENT DOCUMENTS

| | | |
|---|---|---|
| 2017/0200065 A1 | 7/2017 | Wang et al. |
| 2021/0295093 A1* | 9/2021 | Pan ....................... G06V 20/58 |

FOREIGN PATENT DOCUMENTS

| | | |
|---|---|---|
| CN | 105631468 A | 6/2016 |
| CN | 105718555 A | 6/2016 |
| CN | 106503055 A | 3/2017 |
| CN | 106980811 A | 7/2017 |
| CN | 107783960 A | 3/2018 |
| GB | 2544853 A | 5/2017 |
| WO | WO 2016077797 A1 | 5/2016 |

OTHER PUBLICATIONS

Tang Pengjie et al. "Image Description Based on the Fusion of Scene and Object Category Prior Knowledge," Journal of Image and Graphics, vol. 22, No. 9, Sep. 30, 2017.

Tencent Technology, ISR, PCT/CN2019/090723, dated Sep. 18, 2019, 2 pgs.

Extended European Search Report, EP19829535., dated APr. 16, 2021, 10 pgs.

Li Yu et al., "Let Your Photos Talk: Generating Narrative Paragraph for Photo Stream via Bidirectional Attention Recurrent Neural Networks", Proceedings of the 31$^{st}$ AAAI Conference on Artificial Intelligence, vol. 31, No. 1, Feb. 12, 2017, pp. 1445-1452, XP055793430, Retrieved from the Internet: https://ojs.aaai.org/index.php/AAAI/article/view/10760.

Hanqi Wang et al., "Learning Deep Contextual Attention Network for Narrative Photo Steam Captioning", Proceedings of the on Thematic Workshops of ACM Multimedia 2017, Thematic Workshops '17, Jan. 1, 2017, pp. 271-279, XP055793373, New York, NY, USA, DOI: 10.1145/3126686.3126715, ISBN: 978-1-4503-5416-5, Retrieved from the Internet: https://www.researchgate.net/publication/320580062_Learning_Deep_Contextual_Attention_Network_for_Narrative_Photo_Stream_Captioning.

Jing Wang et al., "Show, Reward and Tell: Automatic Generation of Narrative Paragraph from Photo Stream by Adversarial Training", Proceedings of the 32$^{nd}$ AAAI Conference on Artificial Inteeligence, Apr. 27, 2018, pp. 7396-7403, XP055793375.

Quanzeng You et al., "Image Captioning With Semantic Attention", 2016 IEEE Conference on Computer Vision and Pattern Recognition (CVPR), Jun. 27, 2016, pp. 4651-4659, XP033021656.

Tencent Technology, WO, PCT/CN2019/090723, Sep. 18, 2019, 3 pgs.

Tencent Technology, IPRP, PCT/CN2019/090723, dated Jan. 5, 2021, 4 pgs.

* cited by examiner

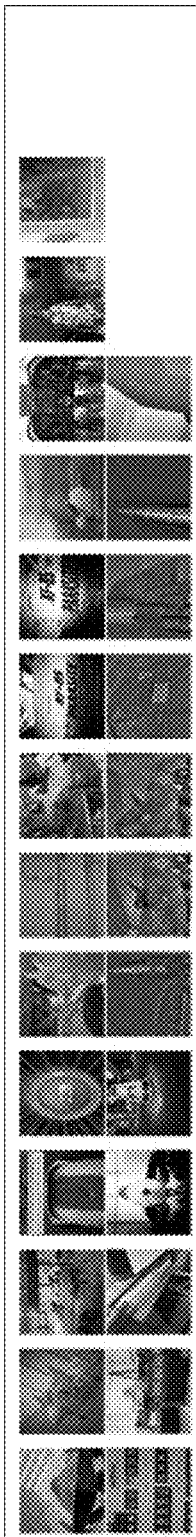

FIG. 8

(English Translation of the Chinese text above) We went to the airplane museum. There are many planes of different types. There are also many spaceships. This is a very impressive airplane. The plane is very large and can be seen at any time.

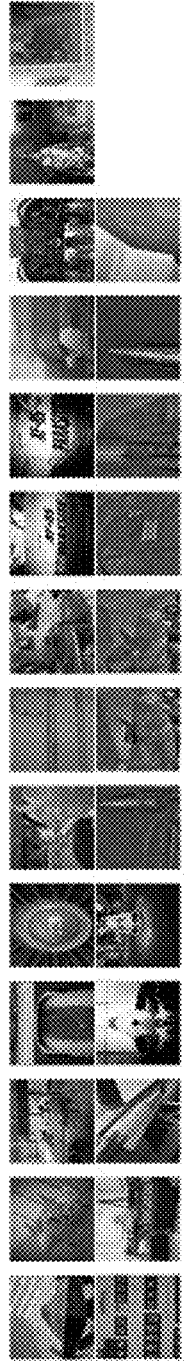

FIG. 9 we went to the airplane museum , there is a lot of different types of the planes , there was also a lot of aircraft , this was very impressed plane , it is huge and ready to see .

PICTURE SET DESCRIPTION GENERATION METHOD AND APPARATUS, AND COMPUTER DEVICE AND STORAGE MEDIUM

CROSS REFERENCE TO RELATED APPLICATIONS

This application is a continuation application of PCT Patent Application No. PCT/CN2019/090723, entitled "PICTURE SET DESCRIPTION GENERATION METHOD AND APPARATUS, AND COMPUTER DEVICE AND STORAGE MEDIUM" filed on Jun. 11, 2019, which claims priority to Chinese Patent Application No. 201810732095.4, entitled "PICTURE SET DESCRIPTION GENERATION METHOD AND APPARATUS, AND COMPUTER DEVICE" filed Jul. 5, 2018, all of which are incorporated by reference in their entirety.

FIELD OF THE TECHNOLOGY

Embodiments of this application relate to the field of image processing technologies, and in particular, to a picture set description generation method and apparatus, a computer device, and a storage medium.

BACKGROUND OF THE DISCLOSURE

A natural language needs to be used for describing a picture set in some application scenarios, producing various benefits. For example, this method may be deployed in an educational website to develop comprehension, may be deployed in a social networking site to automatically record personal experiences according to albums or classify albums or may be combined with a voice system to assist the visually impaired. Therefore, it is necessary to provide a solution of generating picture set textual description information.

SUMMARY

Embodiments of this application provide a picture set description generation method and apparatus, a computer device, and a storage medium.

According to one aspect, an embodiment of this application provides a method of generating a description for a picture set, performed by a computer device having a processor and memory storing a plurality of programs to be executed by the processor, the method comprising:

acquiring a picture set to be processed;

performing picture feature extraction on each picture in the picture set to acquire a picture feature corresponding to the picture, and forming a picture feature sequence corresponding to the picture set by using the picture features corresponding to the pictures;

performing scene feature extraction on a respective picture feature subsequence corresponding to each scene within the picture feature sequence to acquire a scene feature corresponding to the scene, and forming a scene feature sequence corresponding to the picture set by using the scene features corresponding to the scenes; and generating textual description information of the picture set according to the picture feature sequence and the scene feature sequence that correspond to the picture set.

According to still another aspect, an embodiment of this application provides a computer device including a memory, a processor, and a plurality of computer programs stored in the memory that, when executed by the processor, cause the computer device to perform the foregoing method of generating a description for a picture set.

According to yet another aspect, an embodiment of this application provides a non-transitory computer-readable storage medium, storing a plurality of processor-executable instructions, the instructions, when executed by one or more processors of a computer device, cause the computer device to perform the foregoing method of generating a description for a picture set.

It may be understood that the foregoing general descriptions and the following detailed descriptions are only exemplary and explanatory but cannot limit this application.

BRIEF DESCRIPTION OF THE DRAWINGS

The accompanying drawings herein are incorporated into this specification and form a part of this specification, showing embodiments that conform to this application, and are used for describing the principle of this application together with this specification.

FIG. 8 is a schematic diagram of displaying Chinese textual description information below all pictures in a picture set.

FIG. 9 is a schematic diagram of displaying English textual description information below all pictures in a picture set.

The foregoing accompanying drawings have shown specific embodiments of this application, and the following provides more details. These accompanying drawings and text descriptions do not intend to limit the scope of the idea of this application in any way, and instead, describe concepts of this application for a person skilled in the art with reference to particular embodiments.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent the same or similar elements. The following implementations described in the following exemplary embodiments do not represent all implementations that are consistent with this application. On the contrary, the implementations are merely examples of apparatuses and methods that are described in detail in the appended claims and that are consistent with some aspects of this application.

Figure 1A:
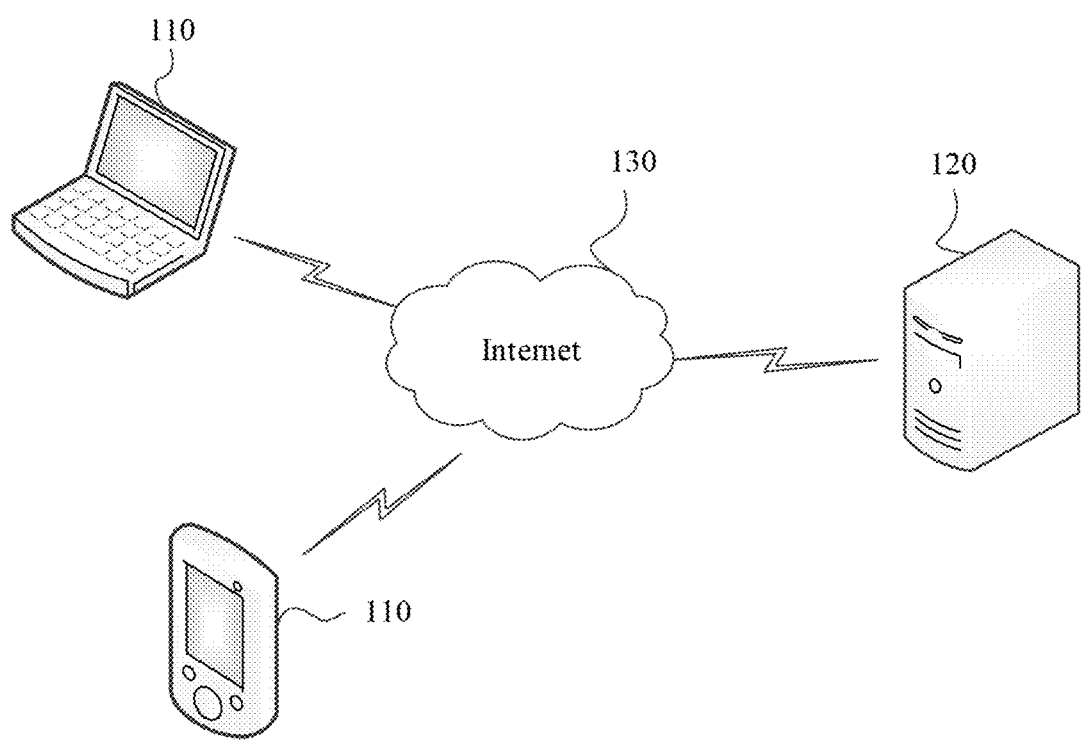
FIG. 1a is a diagram of a system architecture according to an embodiment of this application.

FIG. 1a is a diagram of a system architecture of a picture set description generation method according to an embodiment of this application. Referring to FIG. 1a, the picture set description generation method may be implemented by the system architecture. The system architecture includes a client device 110 and a back-end server 120.

The client device 110 may be a smart phone or a computer of a user, on which clients of various application software are installed. The user may log in by using the client device and use the clients of the various application software. The clients of the application software may include a picture processing client.

The back-end server 120 may be a server or a server cluster, and can provide a corresponding service to the client device corresponding to a client installed on the client device 110. For example, the server 120 may be a back-end server providing a picture processing service to the picture processing client.

The client device 110 communicates with the back-end server 120 through a communication network 130. The communication network 130 may be a local area network (LAN), a metropolitan area network (MAN), a wide area network (WAN), a mobile network, a wired network or a wireless network, a dedicated network or the like.

Figure 1B:
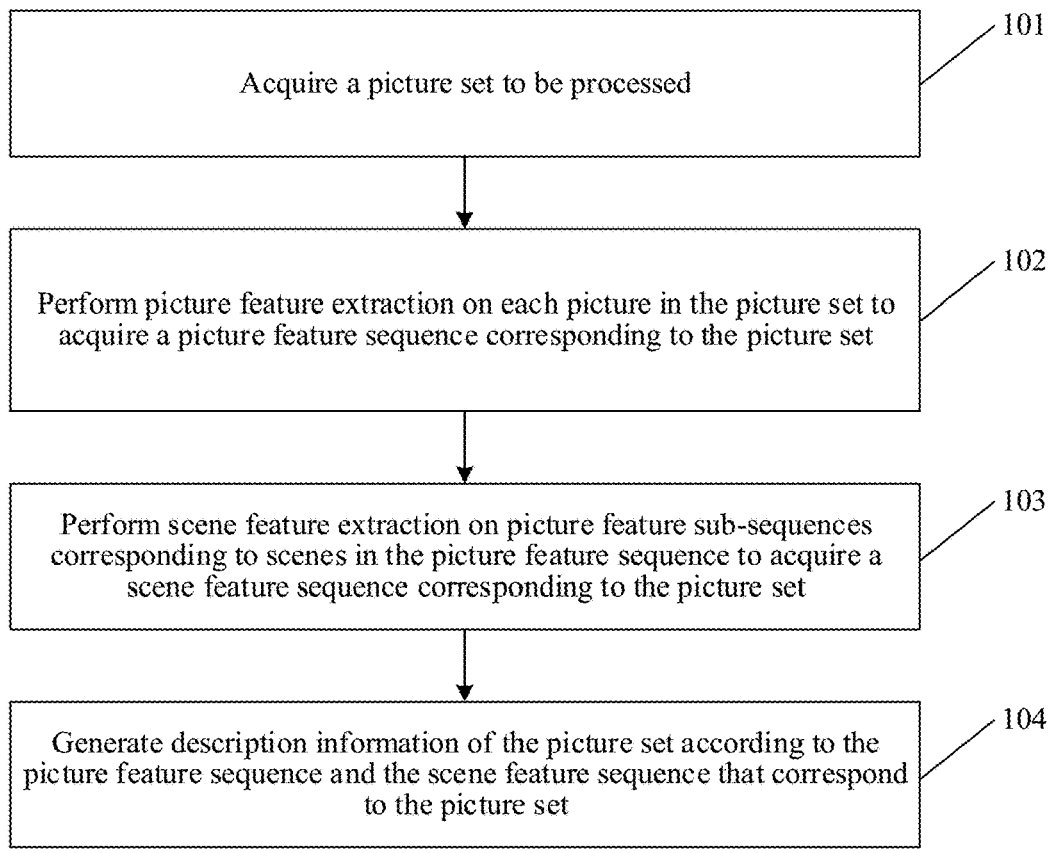
FIG. 1b is a flowchart of an embodiment of a picture set description generation method according to this application.

FIG. 1b is a flowchart of an embodiment of a picture set description generation method according to this application. The picture set description generation method in this embodiment may be implemented by a picture set description generation apparatus. The picture set description generation apparatus may be specifically a hardware device or software installed on the hardware device. The hardware device is a computer device. The computer device may be the client device in FIG. 1a (the client device herein has an independent picture processing capability) or may be the back-end server in FIG. 1b (the client device herein may have no independent picture processing capability, a picture that needs to be processed can be inputted by using the client device and is then processed by the back-end server). As shown in FIG. 1b, the picture set description generation method performed by the computer device may include the following steps:

S101. Acquire a picture set to be processed.

In this embodiment, the picture set to be processed may include a plurality of pictures arranged in chronological order. The pictures may be acquired through photographing, scanning, drawing or the like. The picture set may be, for example, an album. The picture set to be processed may include a group of pictures taken within a period.

S102. Perform picture feature extraction on each picture in the picture set to acquire a picture feature sequence corresponding to the picture set.

It may be understood that step S102 may be alternatively described as follows: performing picture feature extraction on each picture in the picture set to acquire a picture feature corresponding to the picture, and forming a picture feature sequence corresponding to the picture set by using the picture features corresponding to the pictures.

In this embodiment, the process of step 102 performed by the picture set description generation apparatus may be specifically: extracting, for each picture in the picture set, a feature vector corresponding to the picture; inputting the feature vector corresponding to each picture in the picture set into a picture feature model to acquire the picture feature corresponding to the picture; and determining a picture feature sequence corresponding to the picture set according to the picture features corresponding to the pictures. It may be understood that the process may be alternatively described as follows: extracting a feature vector corresponding to each picture in the picture set; inputting the feature vector corresponding to each picture in the picture set into a picture feature model to acquire the picture feature corresponding to the picture; and forming a picture feature sequence corresponding to the picture set by using the picture features corresponding to the pictures.

The picture set description generation apparatus can sequentially input each picture in the picture set into a feature vector extraction module to acquire a feature vector outputted by the feature vector extraction module. The feature vector extraction module may be specifically a convolutional neural network (CNN), for example, ResNet-101. The outputted feature vector may be a 2048-dimensional feature vector. A formula for acquiring a feature vector corresponding to a picture may be shown as Formula (1) in the following.

$$f_i = \text{Resnet101}(\alpha_i) \qquad (1)$$

where $f_i$ represents a feature vector corresponding to an $i^{th}$ picture; and $\alpha_i$ represents the $i^{th}$ picture.

In this embodiment, the picture feature model may be specifically a bidirectional recurrent neural network (BRNN), for example, a bidirectional gated recurrent unit (biGRU). Formulas for acquiring a picture feature may be shown as Formula (2) and Formula (3) in the following.

$$h_i = \text{biGRU}(f_i, \vec{h}_{i-1}, \overleftarrow{h}_{i+1}) \qquad (2)$$

$$v_i = \text{ReLU}(h_i + f_i) \qquad (3)$$

where $\vec{h}_{i-1}$ represents a state at a previous moment in the positive time direction of the BRNN; $\overleftarrow{h}_{i+i}$ represents a state at the previous moment in the negative time direction of the BRNN; $h_i$ represents a state of the $i^{th}$ picture at a current moment; ReLU represents a rectified linear unit and is an activation function usually used in an artificial neural network; and $v_i$ represents a picture feature of the $i^{th}$ picture. The current moment indicates a moment at which a picture feature vector of the $i^{th}$ picture is inputted into the BRNN; the previous moment in the positive time direction indicates a moment at which a picture feature vector of an $(i-1)^{th}$ picture is inputted into the BRNN; and the previous moment in the negative time direction indicates a moment at which a picture feature vector of the $(i+1)^{th}$ picture is inputted into the BRNN. An interval between the current moment and the previous moment is an input time difference between two adjacent picture feature vectors. The input time difference is determined by a processing speed of the BRNN.

Figure 2:
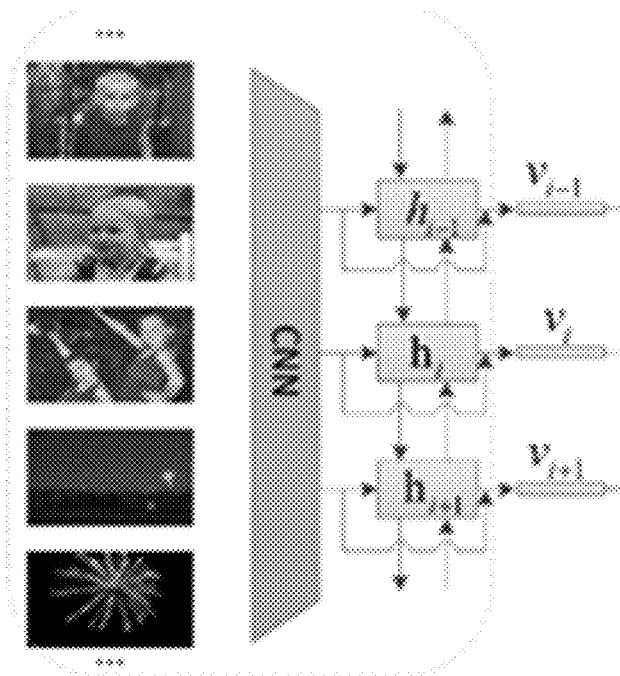
FIG. 2 is a schematic diagram of acquiring a picture feature sequence corresponding to a picture set.

Correspondingly, a schematic diagram of the performing picture feature extraction on each picture in the picture set to acquire a picture feature sequence corresponding to the picture set may be shown in FIG. 2. In FIG. 2, each picture in the picture set is inputted into the CNN, and the feature vector $f_i$ outputted by the CNN is inputted into the BRNN.

The BRNN combines the feature vector $f_i$, $\vec{h}_{i-1}$, and $\overleftarrow{h}_{i+1}$ to obtain the state $h_i$ of the picture at the current moment, and combine $h_i$ and the feature vector $f_i$ to obtain the picture feature of the picture.

S103. Perform scene feature extraction on picture feature sub-sequences corresponding to scenes in the picture feature sequence to acquire a scene feature sequence corresponding to the picture set.

It may be understood that step S103 may be alternatively described as follows: performing scene feature extraction on a picture feature sub-sequence corresponding to each scene in the picture feature sequence to acquire a scene feature corresponding to the scene, and forming a scene feature sequence corresponding to the picture set by using the scene features corresponding to the scenes.

In this embodiment, before step S103, the picture set description generation apparatus may first acquire the picture feature sub-sequences corresponding to the scenes in the picture feature sequence. The process of the acquiring the picture feature sub-sequences corresponding to the scenes in the picture feature sequence may be specifically as follows: comparing any two adjacent picture features in the picture feature sequence to determine whether the adjacent picture features belong to the same scene; and determining a plurality of consecutive picture features belonging to the same scene as a picture feature sub-sequence of one scene.

Certainly, if a picture feature and any picture feature adjacent to the picture feature do not belong to the same scene, the picture feature is determined as a picture feature sub-sequence in one scene, the picture feature sub-sequence including the one picture feature. That is, if a picture feature a and any picture feature adjacent to the picture feature a do not belong to the same scene, the picture feature a separately corresponds to one scene. A picture feature sub-sequence of the scene includes only the picture feature a. It can be seen that in this case a picture feature sub-sequence corresponding to a scene different from other scenes includes a single picture feature.

The process of the comparing, by the picture set description generation apparatus, any two adjacent picture features in the picture feature sequence to determine whether the adjacent picture features belong to the same scene may be specifically as follows: inputting a state, that is, a first state, of the former first picture feature of the adjacent picture features and the latter second picture feature into a scene boundary detector to obtain a flag bit outputted by the scene boundary detector, the flag bit being a flag bit corresponding to the second picture feature, the first state of the first picture feature being obtained after the first picture feature is inputted into a scene feature model; and determining, according to the flag bit, whether the adjacent picture features belong to the same scene. The first picture feature and the second picture feature are two adjacent picture features in the picture feature sequence.

A formula for determining whether adjacent picture features belong to the same scene may be shown as Formula (4) as follows.

$$k_i = \begin{cases} 1, & \sigma(W_s * (W_{sv}v_i + W_{sh}\tilde{h}_{i-1} + b_S)) > 0.5 \\ 0, & \sigma(W_s * (W_{sv}v_i + W_{sh}\tilde{h}_{i-1} + b_S)) \le 0.5 \end{cases} \quad (4)$$

where $k_i$ represents a flag bit corresponding to an $i^{th}$ picture feature; σ represents the activation function Sigmoid; $\tilde{h}_{i-1}$ represents a first state of an $(i-1)^{th}$ picture feature; $W_s$, $W_{sv}$ and $W_{sh}$ represent weights; and $b_s$ represents a trainable internal parameter of the scene boundary detector.

It may be understood that herein a state outputted by the scene feature model is referred to as a first state, and an adjusted state of the first state is referred to as a second state. For example, a second state of the $(i-1)^{th}$ picture feature is determined according to a first state of the $(i-1)^{th}$ picture feature and the flag bit corresponding to the $i^{th}$ picture feature, and a first state of the $i^{th}$ picture feature is determined according to the second state of the $(i-1)^{th}$ picture feature and the $i^{th}$ picture feature.

In this embodiment, it is determined that the $i^{th}$ picture feature and $(i-1)^{th}$ picture feature do not belong to the same scene when the flag bit corresponding to the $i^{th}$ picture feature is 1. It is determined that the $i^{th}$ picture feature and $(i-1)^{th}$ picture feature belong to the same scene when the flag bit corresponding to the $i^{th}$ picture feature is 0.

In this embodiment, because adjacent picture features are compared to determine whether adjacent picture scenes belong to the same scene, an eventually determined picture feature sub-sequence corresponding to one scene includes a single picture feature or a plurality of consecutive picture features, but does not include a plurality of non-consecutive picture features.

Correspondingly, the process of step S103 performed by the picture set description generation apparatus may be specifically as follows: sequentially inputting, for each scene, picture features in the picture feature sub-sequence into the scene feature model to acquire a state of the last picture feature in the picture feature sub-sequence, an input of the scene feature model being a picture feature and a state of a previous picture feature of the picture feature, an output of the scene feature model being a state of the picture feature; and determining the state of the last picture feature as a scene feature corresponding to the scene. The state of the picture feature may include a current output state and a memory of the picture feature. It may be understood that the specific process of step S103 may be alternatively described as follows: sequentially inputting picture features in the picture feature sub-sequence corresponding to each scene into the scene feature model to acquire a first state of the last picture feature in the picture feature sub-sequence, an input of the scene feature model being a picture feature and a second state of a previous picture feature of the picture feature, an output of the scene feature model being a first state of the picture feature, the second state of the previous picture feature being a state obtained after the first state of the previous picture feature is adjusted according to a flag bit corresponding to the picture feature; and using the first state of the last picture feature as a scene feature corresponding to the scene.

In this embodiment, the scene feature model may be specifically a recurrent neural network (RNN) based on a long short-term memory (LSTM). A formula for acquiring a scene feature may be shown as Formula (5) in the following.

$$\tilde{h}_i, \tilde{c}_i = \text{LSTM}(v_i, \tilde{h}_{i-1}, \tilde{c}_{i-1}) \quad (5)$$

where $\tilde{h}_i$ represents a current output state of the $i^{th}$ picture feature; and $\tilde{c}_i$ represents a memory of the $i^{th}$ picture feature.

$\tilde{h}_i$ and $\tilde{c}_i$ form the first state of the $i^{th}$ picture feature. If the $i^{th}$ picture feature is the last picture feature in a picture feature sub-sequence corresponding to a scene, $\tilde{h}_i$ and $\tilde{c}_i$ are determined as a scene feature corresponding to the scene. If the $i^{th}$ picture feature is not the last picture feature in the picture feature sub-sequence corresponding to a scene, $\tilde{h}_i$ and $\tilde{c}_i$ continue to be inputted into the scene feature model to acquire a current output state and a memory corresponding to an $(i+1)^{th}$ picture feature till a current output state and a memory of the last picture feature in the picture feature sub-sequence are acquired.

$\tilde{h}_{i-1}$ and $\tilde{c}_{i-1}$ in Formula (5) denote the second state of the $(i-1)^{th}$ picture feature. The value of the second state is determined based on the flag bit of the $i^{th}$ picture feature and the first state of the $(i-1)^{th}$ picture feature. That is, the second state of the $(i-1)^{th}$ picture feature is determined by a result of determining whether the $i^{th}$ picture feature and the $(i-1)^{th}$ picture feature belong to the same scene. If the $i^{th}$ picture feature and the $(i-1)^{th}$ picture feature belong to the same scene, $k_i$ is 0, and $\tilde{h}_{i-1}$ and $\tilde{c}_{i-1}$ are kept unchanged. $\tilde{h}_{i-1}$ is an output state at the previous moment; and $\tilde{c}_{i-1}$ represents a memory at the previous moment. That is, and $\tilde{h}_{i-1}$ and are the first state of the $(i-1)^{th}$ picture feature. In this case, the second state is the same as the first state. If the $i^{th}$ picture feature and the $(i-1)^{th}$ picture feature do not belong to the same scene, $k_i$ is 1, and both and $\tilde{h}_{i-1}$ and $\tilde{c}_{i-1}$ are 0. That is, the second state of the $(i-1)^{th}$ picture feature is 0. Formulas for calculating and $\tilde{h}_{i-1}$ may be respectively shown as Formula (6) and Formula (7) in the following.

$$\tilde{h}_{i-1} \leftarrow \tilde{h}_{i-1} * (1-k_i) \qquad (6)$$

$$\tilde{c}_{i-1} \leftarrow \tilde{c}_{i-1} * (1-k_i) \qquad (7)$$

Figure 3:
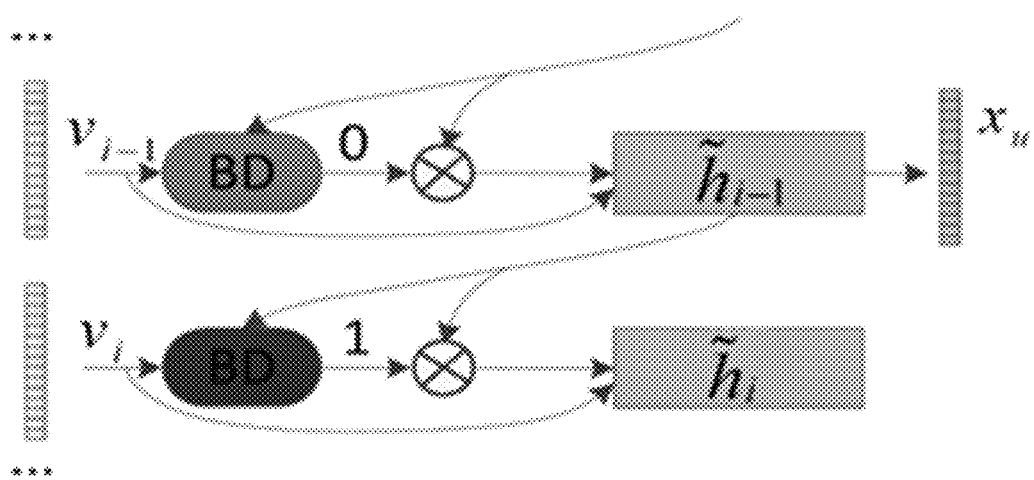
FIG. 3 is a schematic diagram of acquiring a scene feature sequence corresponding to a picture set.

In this embodiment, a schematic diagram of the performing scene feature extraction on picture feature sub-sequences corresponding to scenes in the picture feature sequence to acquire a scene feature sequence corresponding to the picture set may be shown in FIG. 3. In FIG. 3, BD represents the scene boundary detector. An input of the scene boundary detector is the $i^{th}$ picture feature and the first state of the $(i-1)^{th}$ picture feature, and a flag bit of 1 is outputted. An input of the scene feature model is adjusted $\tilde{h}_{i-1}$ determined according to the value of 1 and the first state that is, the second state of the $(i-1)^{th}$ picture feature and the $i^{th}$ picture feature, and an output is the current output state $\tilde{h}_i$ of the $i^{th}$ picture feature, that is, the first state of the $i^{th}$ picture feature. $x_u$ in FIG. 3 represents a scene feature corresponding to a $u^{th}$ scene.

It can be seen that because some models requires an input of a state before an adjustment and some models requires a state after an adjustment, herein, the state before the adjustment is referred to as a first state and the state after the adjustment is referred to as a second state to distinguish between inputted states.

S104. Generate textual description information of the picture set according to the picture feature sequence and the scene feature sequence that correspond to the picture set.

In this embodiment, the process of step 104 performed by the picture set description generation apparatus may be specifically as follows: fusing the picture feature sequence and the scene feature sequence that correspond to the picture set to obtain a picture set feature sequence corresponding to the picture set; inputting, for each picture set feature in the picture set feature sequence, the picture set feature into a decoder to acquire a textual description statement corresponding to the picture set feature, that is, inputting each picture set feature in the picture set feature sequence into a decoder to acquire a textual description statement corresponding to the picture set feature; and combining the textual description statements corresponding to the picture set features to obtain the textual description information of the picture set. Formulas for acquiring a picture set feature sequence corresponding to a picture set may be shown as Formula (8) and Formula (9) in the following. The process of the fusing the picture feature sequence and the scene feature sequence that correspond to the picture set to obtain a picture set feature sequence corresponding to the picture set may be specifically as follows: acquiring, for each picture in the picture set, a union of a picture feature and a scene feature of the picture; and calculating a weighted sum of a union of the pictures to obtain the picture set feature sequence corresponding to the picture set.

$$z_q = \sum_{i=1}^{m+u} \alpha_i^q r_i \qquad (8)$$

$$\sum_{i=1}^{m+u} \alpha_i^q = 1 \qquad (9)$$

where $z_q$ represents a $q^{th}$ picture set feature; $r_i \in R = (V \cup X)$ represents a union of the picture feature sequence and the scene feature sequence; m represents a quantity of picture features in the picture feature sequence; and u represents a quantity of scene features in the scene feature sequence. $\alpha_i^q$ represents the weight of an $i^{th}$ feature during the generation of the $q^{th}$ picture set feature. The $i^{th}$ feature indicates the $i^{th}$ picture feature or an $i^{th}$ scene feature after the picture feature and the scene feature are combined. In this embodiment, a quantity of the generated picture set features is determined based on a quantity of provided weights. If k weights of features in picture set feature are provided, only the k picture set features can be determined according to the weights. In this embodiment, as shown in Formula (9), for each picture set feature, the sum of the weights of the picture features and the weights of the scene features is 1.

Figure 4:
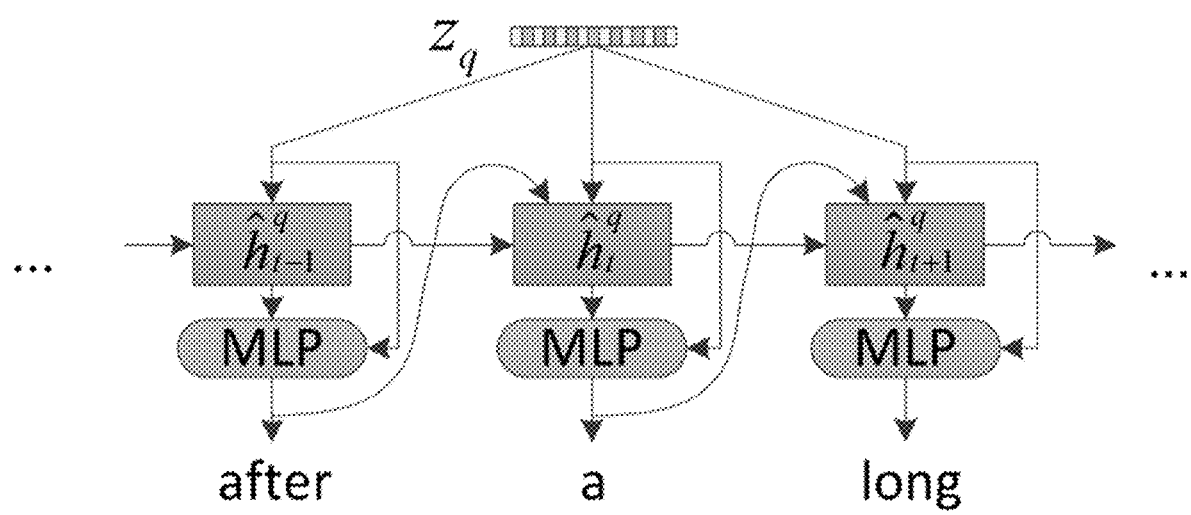
FIG. 4 is a schematic diagram of acquiring a textual description statement corresponding to a picture set feature.

In this embodiment, an input of the decoder is the picture set feature, a character outputted by the decoder at a previous moment, and a hidden state of the decoder at the previous moment. The character may be a Chinese character or an English word. FIG. 4 is a schematic diagram of acquiring a textual description statement corresponding to a picture set feature. In FIG. 4, when the input of the decoder is the $q^{th}$ picture set feature $z_q$, a $(t-1)^{th}$ word $s_{t-1}^q$ in a textual description statement corresponding to the $q^{th}$ picture set feature, and a hidden state $\hat{h}_{t-1}^q$ at a previous moment $t-1$, the output of the decoder is a $t^{th}$ word. A formula for acquiring a hidden state at a current moment t may be shown as Formula (10) in the following.

$$\hat{h}_t^q = GRU(E(s_{t-1}^q), \hat{h}_{t-1}^q, z_q) \qquad (10)$$

where $\hat{h}_t^q$ represents the hidden state at the current moment t when a $q^{th}$ description statement corresponding to the $q^{th}$ picture set feature is generated; $\hat{h}_{t-1}^q$ represents the hidden state at the previous moment; $s_{t-1}^q$ represents a word predicted at the previous moment; and E( ) represents a vectorization process of the word.

After $\hat{h}_t^q$ is acquired, a prediction formula of a word at the current moment t may be shown as Formula (11) in the following.

$$P(s_t^q | s_{<t}^q, A) = \text{softmax}(MLP([\tilde{h}_t^q, z_q])) \qquad (11)$$

where $s_t^q \in S_q = \{s_1^q, s_2^q, \ldots, s_n^q\}$ represents the $t^{th}$ word in a textual description statement $S_q$; [ ] represents a cascade operation of two vectors; a multilayer perceptron (MLP) is used for transferring [$\hat{h}_t^q$, $z_q$] to a specific dimension; and the decoder softmax predicts the probability distribution of the word at the current moment t on a word list.

In this embodiment, in the process from the picture feature extraction to the generation of picture set textual description information, used models need to be trained by using corresponding training data. A form of training the models may be end-to-end training. The optimization objective during the training is shown as Formula (12) in the following.

$$\min_{\theta} \sum_{i=1}^{N} \sum_{j=1}^{q} \{-\log P(S_j^i \mid A^i; \theta)\} \quad (12)$$

where $S_j \in \{S_1, S_2, \ldots, S_q\}$ represents the textual description information corresponding to the picture set, including q description statements. $A^i$ represents the $i^{th}$ picture in the picture set; N represents a quantity of pictures in the picture set; and θ is a training parameter. The meaning of Formula (12) is to find a group of training parameters, to obtain a minimum negative number of the sum of all probabilities of the entire picture set description generation method correctly predicting single sentences in the picture set.

The technical solution provided in the embodiments of this application may include the following beneficial effects: A picture set to be processed is acquired; picture feature extraction is performed on each picture in the picture set to acquire a picture feature sequence corresponding to the picture set; scene feature extraction is performed on picture feature sub-sequences corresponding to scenes in the picture feature sequence to acquire a scene feature sequence corresponding to the picture set; and textual description information of the picture set is generated according to the picture feature sequence and the scene feature sequence that correspond to the picture set, so that the textual description information corresponding to the picture set is generated by combining and referring to a picture feature and a scene feature. Therefore, the generated textual description information is relatively accurate. In addition, because the textual description information includes scene information, the picture set can be effectively understood and analyzed according to the textual description information, thereby improving the use experience of the picture set for a user.

Figure 5:
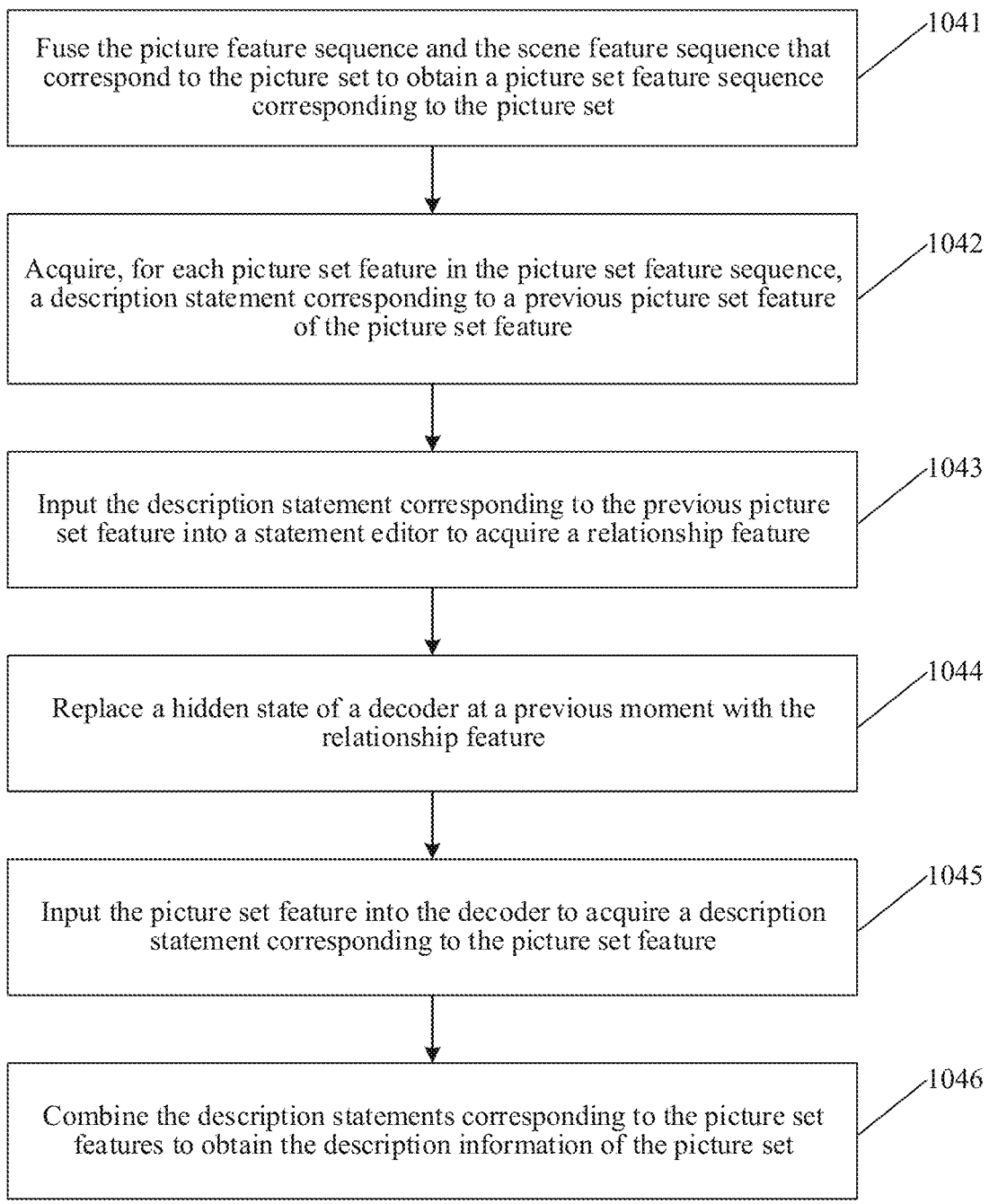
FIG. 5 is a flowchart of another embodiment of a picture set description generation method according to this application.

FIG. 5 is a flowchart of another embodiment of a picture set description generation method according to this application. As shown in FIG. 5, based on the embodiment shown in FIG. 1b, an input of a decoder is a picture set feature, a character outputted by the decoder at a previous moment, and a hidden state of the decoder at the previous moment. It may be understood that the method according to this embodiment may also be performed by a computer device.

Correspondingly, step 104 may specifically include the following steps:

S1041. Fuse the picture feature sequence and the scene feature sequence that correspond to the picture set to obtain a picture set feature sequence corresponding to the picture set.

S1042. Acquire, for each picture set feature in the picture set feature sequence, a textual description statement corresponding to a previous picture set feature of the picture set feature.

In this embodiment, if the picture set feature is the first picture set feature in the picture set feature sequence, steps 1042 to 1044 are skipped, and step 1045 is directly performed to acquire the textual description statement corresponding to the picture set feature.

S1043. Input the textual description statement corresponding to the previous picture set feature into a statement editor to acquire a relationship feature.

Figure 6:
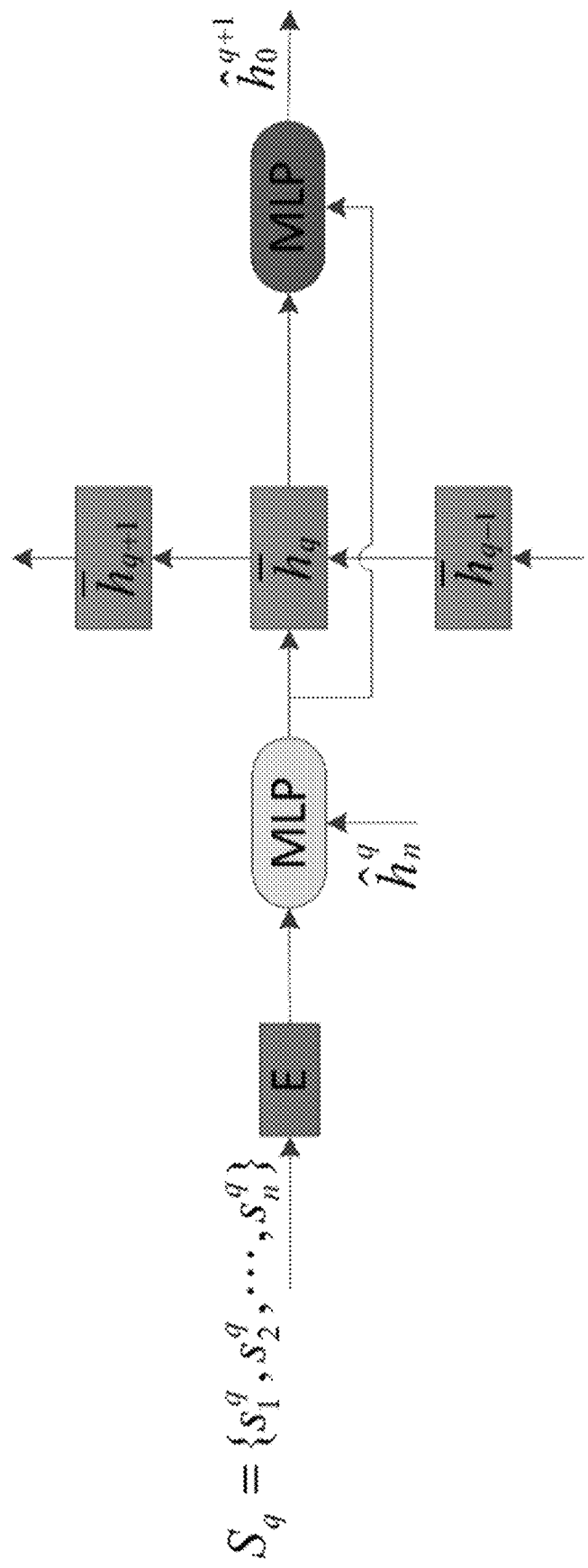
FIG. 6 is a schematic diagram of acquiring a relationship feature.

In this embodiment, the statement editor may be an RNN GRU used for digging out a semantic relationship between description statements in textual description information. An input of the statement editor may be the textual description statement corresponding to the previous picture set feature and a final hidden state $\hat{h}_n^q$ of the decoder obtained after the textual description statement corresponding to the previous picture set feature is generated. An output of the statement editor is the relationship feature. A formula for acquiring a relationship feature may be shown as Formula (13), Formula (14), Formula (15), and Formula (16) in the following.

$$\bar{s}_q = \frac{1}{n}\sum_{i=1}^{n} E(s_i^q) \quad (13)$$

$$c_q = MLP([\bar{s}_q, \hat{h}_n^q]) \quad (14)$$

$$\bar{h}_q = GRU(c_q, \bar{h}_{q-1}) \quad (15)$$

$$\hat{h}_0^{q+1} = MLP([\bar{h}_q, c_q]) \quad (16)$$

where $S_q = \{s_1^q, s_2 s^q, \ldots, s_n^q\}$ represents the textual description statement corresponding to the previous picture set feature; $s_i^q$ represents an $i^{th}$ word in the textual description statement corresponding to the previous picture set feature; $\bar{s}_q$ represents the average vector of vectors of all the words in the textual description statement corresponding to the previous picture set feature; $\hat{h}_n^q$ represents the final hidden state of the decoder after the decoder generates the textual description statement corresponding to the previous picture set feature; $c_q$ represents a fused output after $\bar{s}_q$ and $\hat{h}_n^q$ are inputted into the MLP; $\bar{h}_{q-1}$ represents a hidden state of the statement editor GRU at the previous moment; $\bar{h}_q$ represents a hidden state of the statement editor at the current moment; and the relationship feature MLP($[\bar{h}_q, c_q]$) is used as the hidden state $\hat{h}_0^{q+1}$ at the previous moment of the decoder when a textual description statement corresponding to a current $(q+1)^{th}$ picture set feature is generated. FIG. 6 is a schematic diagram of acquiring a relationship feature.

Figure 7:
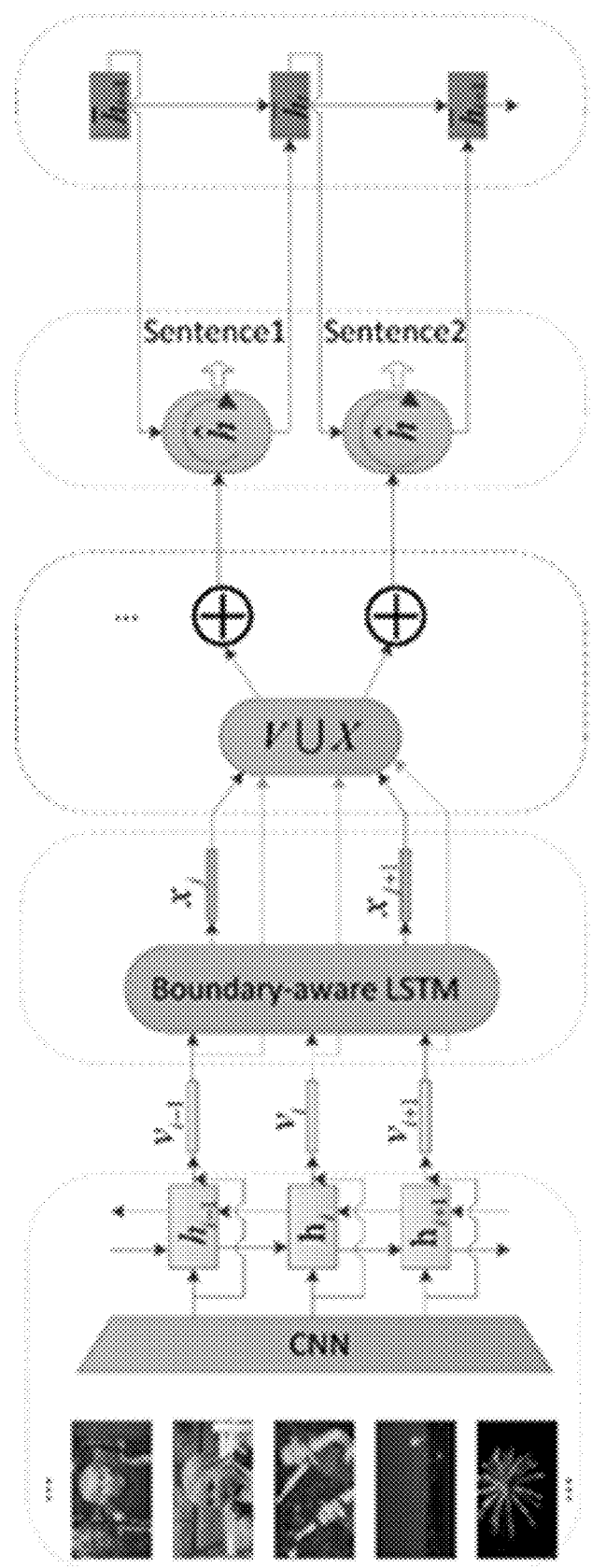
FIG. 7 is an overall schematic diagram of acquiring picture set textual description information according to a picture set to be processed.

In this embodiment, an overall schematic diagram of acquiring picture set textual description information according to a picture set to be processed may be shown in FIG. 7. In FIG. 7, the process from inputting the picture set to be processed to acquiring $v_i$ is performed in step 102. The process from $v_i$ to $x_i$ is performed in step 103. The process from $x_i$ to $\hat{h}$ is performed in step 104. The process from $\hat{h}$ to the end is performed in step 1043.

S1044. Replace the hidden state of the decoder at the previous moment with the relationship feature.

S1045. Input the picture set feature into the decoder to acquire a textual description statement corresponding to the picture set feature.

S1046. Combine the textual description statements corresponding to the picture set features to obtain the textual description information of the picture set.

This embodiment includes: acquiring a textual description statement corresponding to a previous picture set feature of a picture set feature; inputting the textual description statement corresponding to the previous picture set feature into a statement editor to acquire a relationship feature; and replacing a hidden state of a decoder at a previous moment with the relationship feature, and then inputting the picture set feature into the decoder after the replacement to acquire a textual description statement corresponding to the picture set feature, the relationship feature indicating the textual description statement corresponding to the previous picture set feature. The relationship feature is used for replacing the hidden state of the decoder at the previous moment, so that after the replacement, the decoder takes the relationship feature into consideration during the generation of description statement corresponding to the relationship feature, thereby achieving the consistency between the textual description statement corresponding to the relationship feature and a textual description statement corresponding to a previous relationship feature. Therefore, the textual description information of the picture set is closer to a description with a natural language.

In this embodiment, after the textual description information of the picture set is generated, the textual description information of the picture set may be displayed below, above or at another position of the thumbnail of the picture set. Alternatively, the textual description information of the picture set may be displayed below, above or at another position of all pictures in the picture set. When the textual description information of the picture set is displayed below, above or at another position of the thumbnail of the picture set, it indicates that when the picture set is not open and displayed in the form of a thumbnail of or one picture in the picture set, the textual description information of the picture set may be displayed below, above or at another position of the thumbnail or the picture. For example, FIG. 8 is a schematic diagram of displaying Chinese textual description information below all pictures in a picture set. FIG. 9 is a schematic diagram of displaying English textual description information below all pictures in the picture set.

The following is an apparatus embodiment of this application that can be used for performing the method embodiments of this application. For details not disclosed in the apparatus embodiment of this application, reference may be made to the method embodiments of this application.

Figure 10:
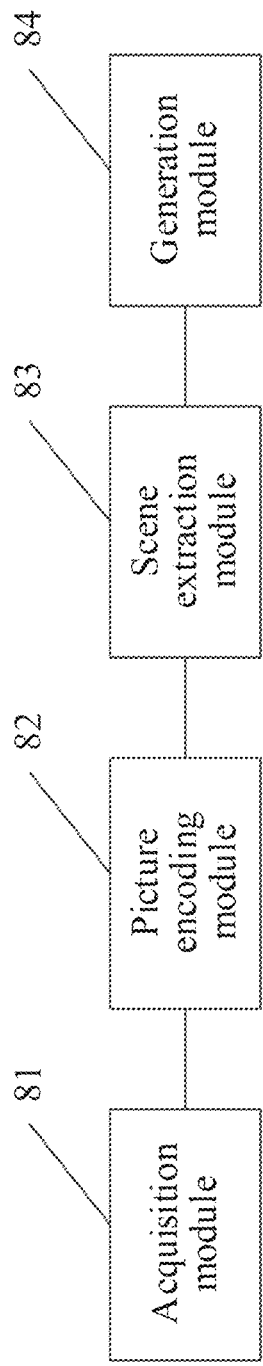
FIG. 10 is a schematic structural diagram of an embodiment of a picture set description generation apparatus according to this application.

FIG. 10 is a schematic structural diagram of an embodiment of a picture set description generation apparatus according to this application. The picture set description generation apparatus in this embodiment may be a hardware device or software installed on the hardware device. The hardware device is a computer device such as a mobile terminal, a cloud platform or the like, implementing the picture set description generation method provided in the embodiment shown in FIG. 1 or the embodiment shown in FIG. 5 in this application. The picture set description generation apparatus includes an acquisition module 81, a picture encoding module 82, a scene extraction module 83, and a generation module 84.

The acquisition module 81 is configured to acquire a picture set to be processed.

The picture encoding module 82 is configured to perform picture feature extraction on each picture in the picture set to acquire a picture feature sequence corresponding to the picture set. That is, the picture encoding module 82 is configured to: perform picture feature extraction on each picture in the picture set to acquire a picture feature corresponding to the picture, and form a picture feature sequence corresponding to the picture set by using the picture features corresponding to the pictures.

The scene extraction module 83 is configured to perform scene feature extraction on picture feature sub-sequences corresponding to scenes in the picture feature sequence to acquire a scene feature sequence corresponding to the picture set. That is, the scene extraction module 83 is configured to: perform scene feature extraction on a picture feature sub-sequence corresponding to each scene in the picture feature sequence to acquire a scene feature corresponding to the scene, and form a scene feature sequence corresponding to the picture set by using the scene features corresponding to the scenes.

The generation module 84 is configured to generate textual description information of the picture set according to the picture feature sequence and the scene feature sequence that correspond to the picture set.

In this embodiment, the picture encoding module 82 may be specifically configured to: extract, for each picture in the picture set, a feature vector corresponding to the picture; input the feature vector corresponding to each picture in the picture set into a picture feature model to acquire the picture feature corresponding to the picture; and determine a picture feature sequence corresponding to the picture set according to the picture features corresponding to the pictures. That is, the picture encoding module 82 may be specifically configured to: extract a feature vector corresponding to each picture in the picture set; input the feature vector corresponding to each picture in the picture set into a picture feature model to acquire the picture feature corresponding to the picture; and form a picture feature sequence corresponding to the picture set by using the picture features corresponding to the pictures.

Figure 11:
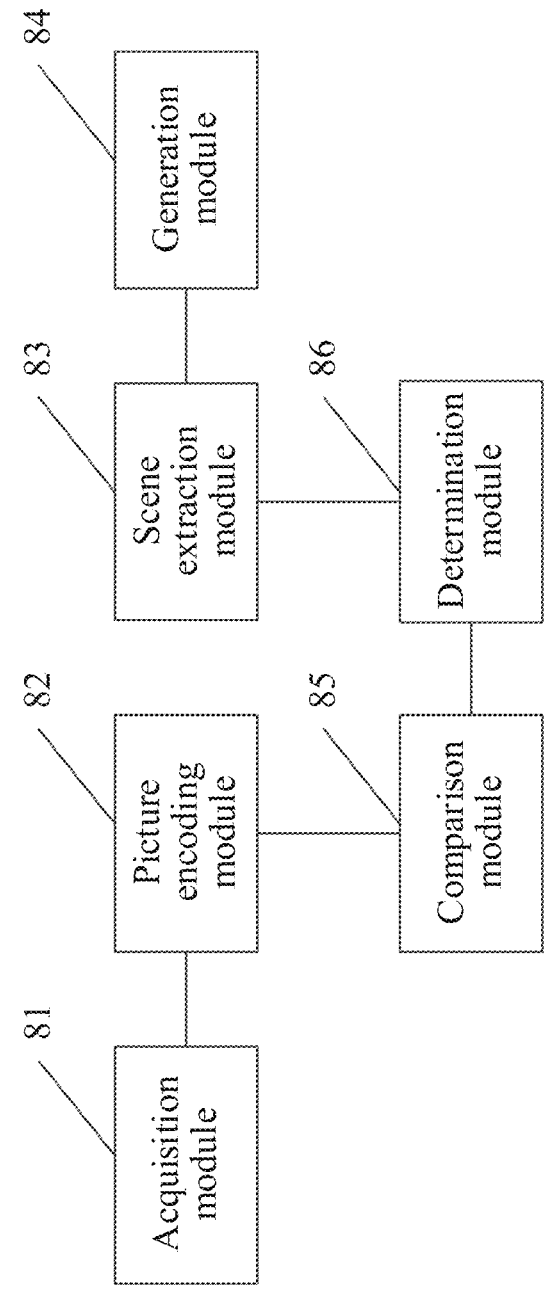
FIG. 11 is a schematic structural diagram of another embodiment of a picture set description generation apparatus according to this application.

Further, referring to FIG. 11, based on the embodiment shown in FIG. 10, the apparatus further includes a comparison module 85 and a determination module 86.

The comparison module 85 is configured to compare any two adjacent picture features in the picture feature sequence to determine whether the adjacent picture features belong to the same scene.

The determination module 86 is configured to: form the picture feature sub-sequence corresponding to one scene by using a plurality of consecutive picture features belonging to the same scene; and determine, in a case that a picture feature and any picture feature adjacent to the picture feature do not belong to the same scene, the picture feature as a picture feature sub-sequence in one scene, the picture feature sub-sequence including the one picture feature.

The comparison module 85 may be specifically configured to: input a first state of the former first picture feature of the adjacent picture features and the latter second picture feature into a scene boundary detector to obtain a flag bit that is outputted by the scene boundary detector and corresponds to the second picture feature, the first state of the first picture feature being obtained after the first picture feature is inputted into a scene feature model; and determine, according to the flag bit, whether the adjacent picture features belong to the same scene.

Correspondingly, the scene extraction module 83 may be specifically configured to: sequentially input, for each scene, picture features in the picture feature sub-sequence into the scene feature model to acquire a state of the last picture feature in the picture feature sub-sequence, an input of the scene feature model being a picture feature and a state of a previous picture feature of the picture feature, an output of the scene feature model being a state of the picture feature; and determine the state of the last picture feature as a scene feature corresponding to the scene. That is, the scene extraction module 83 may be specifically configured to: sequentially input picture features in the picture feature sub-sequence corresponding to each scene into the scene feature model to acquire a first state of the last picture feature in the picture feature sub-sequence, an input of the scene feature model being a picture feature and a second state of a previous picture feature of the picture feature, an output of the scene feature model being a first state of the picture feature, the second state of the previous picture feature being a state obtained after the first state of the previous picture feature is adjusted according to a flag bit corresponding to the picture feature; and use the first state of the last picture feature as a scene feature corresponding to the scene.

Figure 12:
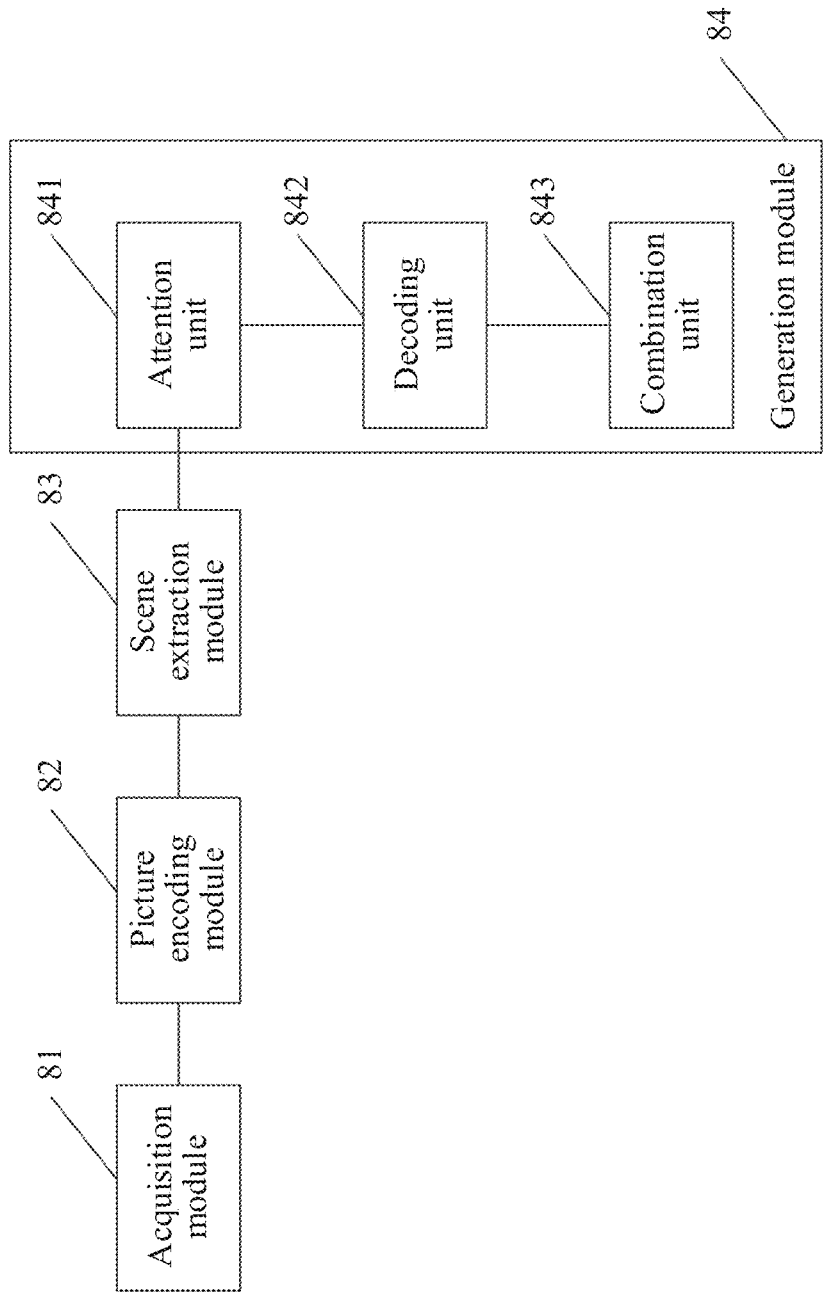
FIG. 12 is a schematic structural diagram of another embodiment of a picture set description generation apparatus according to this application.

Further, referring to FIG. 12, based on the foregoing embodiments, the generation module 84 includes an attention unit 841, a decoding unit 842, and a combination unit 843.

The attention unit 841 is configured to fuse the picture feature sequence and the scene feature sequence that correspond to the picture set to obtain a picture set feature sequence corresponding to the picture set.

The decoding unit 842 is configured to input, for each picture set feature in the picture set feature sequence, the picture set feature into a decoder to acquire a textual description statement corresponding to the picture set feature. That is, the decoding unit 842 is configured to input each picture set feature in the picture set feature sequence into a decoder to acquire a textual description statement corresponding to the picture set feature.

The combination unit 843 is configured to combine the textual description statements corresponding to the picture set features to obtain the textual description information of the picture set.

The technical solution provided in the embodiments of this application may include the following beneficial effects: A picture set to be processed is acquired; picture feature extraction is performed on each picture in the picture set to acquire a picture feature sequence corresponding to the picture set; scene feature extraction is performed on picture feature sub-sequences corresponding to scenes in the picture feature sequence to acquire a scene feature sequence corresponding to the picture set; and textual description information of the picture set is generated according to the picture feature sequence and the scene feature sequence that correspond to the picture set, so that the textual description information corresponding to the picture set is generated by combining and referring to a picture feature and a scene feature. Therefore, the generated textual description information is relatively accurate. In addition, because the textual description information includes scene information, the picture set can be effectively understood and analyzed according to the textual description information, thereby improving the use experience of the picture set for a user.

Figure 13:
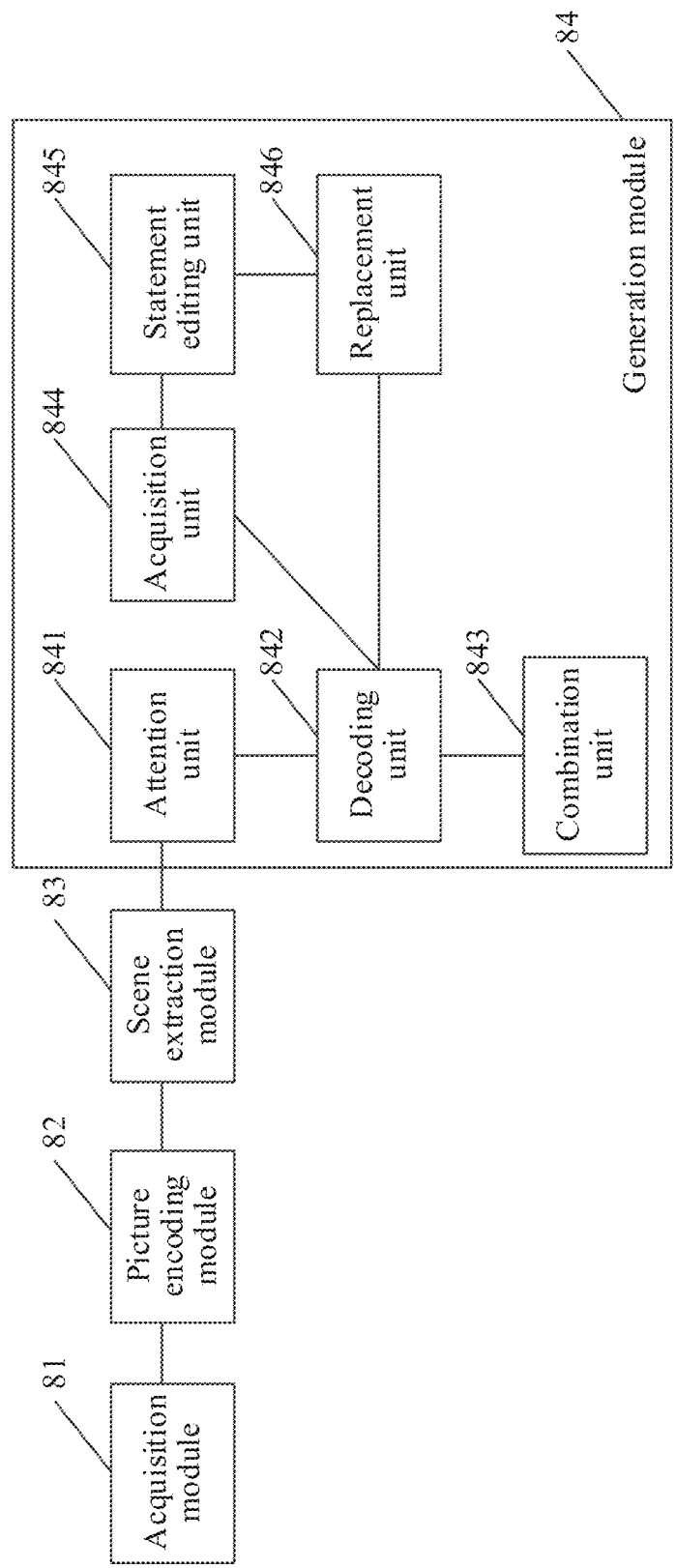
FIG. 13 is a schematic structural diagram of another embodiment of a picture set description generation apparatus according to this application.

Further, referring to FIG. 13, based on the foregoing embodiments, an input of the decoder is the picture set feature, a character outputted by the decoder at a previous moment, and a hidden state of the decoder at the previous moment. Correspondingly, the generation module 84 further includes an acquisition unit 844, a statement editing unit 845, and a replacement unit 846.

The acquisition unit 844 is configured to acquire a textual description statement corresponding to a previous picture set feature of the picture set feature.

The statement editing unit 845 is configured to input the textual description statement corresponding to the previous picture set feature into a statement editor to acquire a relationship feature.

The replacement unit 846 is configured to replace the hidden state of the decoder at the previous moment with the relationship feature.

This embodiment includes: acquiring a textual description statement corresponding to a previous picture set feature of a picture set feature; inputting the textual description statement corresponding to the previous picture set feature into a statement editor to acquire a relationship feature; and replacing a hidden state of a decoder at a previous moment with the relationship feature, and then inputting the picture set feature into the decoder after the replacement to acquire a textual description statement corresponding to the picture set feature, the relationship feature indicating the textual description statement corresponding to the previous picture set feature. The relationship feature is used for replacing the hidden state of the decoder at the previous moment, so that after the replacement, the decoder takes the relationship feature into consideration during the generation of description statement corresponding to the relationship feature, thereby achieving the consistency between the textual description statement corresponding to the relationship feature and a textual description statement corresponding to a previous relationship feature. Therefore, the textual description information of the picture set is closer to a description with a natural language.

Figure 14:
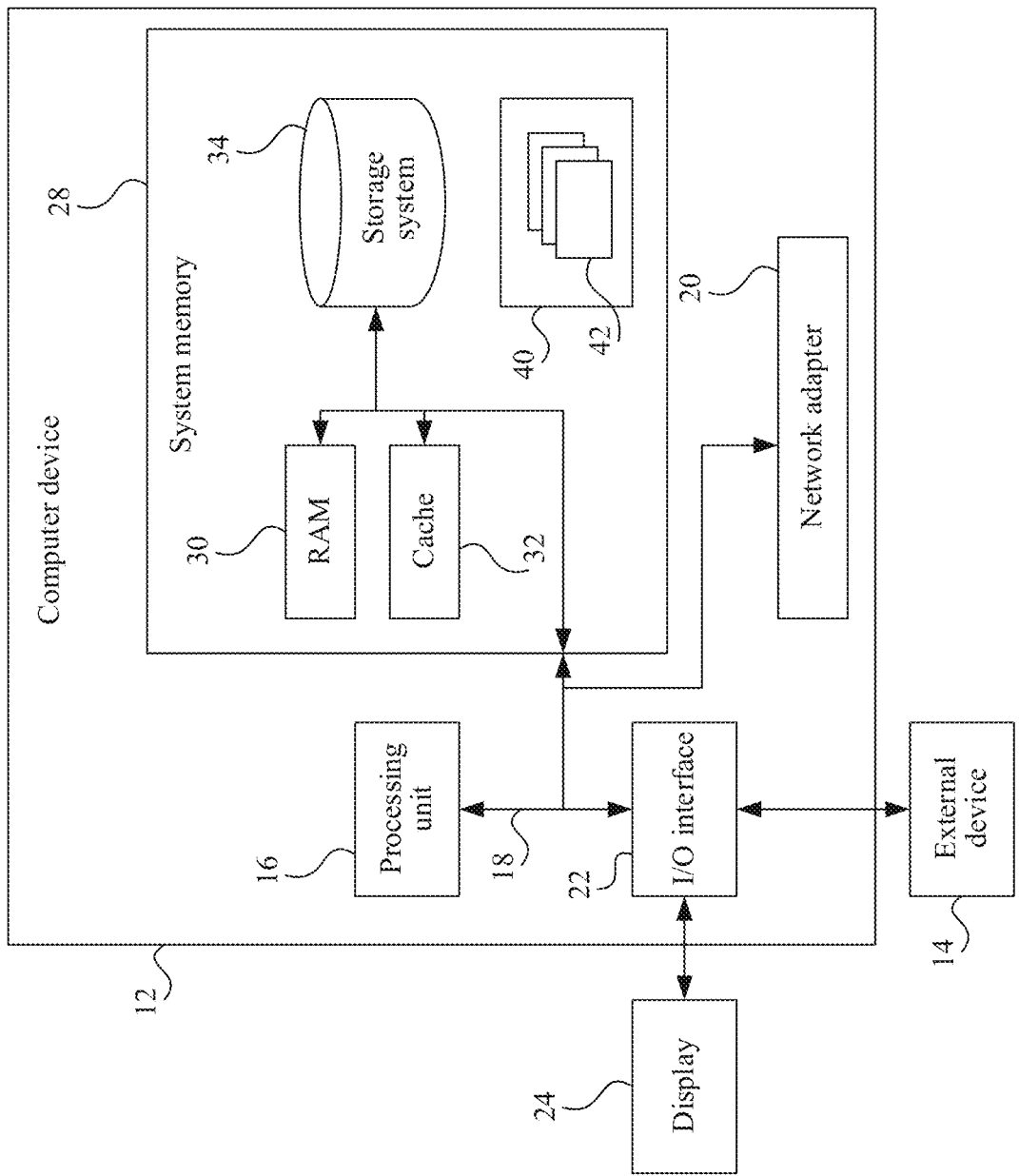
FIG. 14 is a schematic structural diagram of an embodiment of a computer device according to this application.

FIG. 14 is a schematic structural diagram of an embodiment of a computer device according to this application. The computer device in this embodiment can implement a picture set description generation function. The computer device may include: one or more processors; and a memory, configured to store one or more programs, the one or more programs, when executed by the one or more processors, causing the one or more processors to implement the foregoing picture set description generation method, for example: acquiring a picture set to be processed; performing picture feature extraction on each picture in the picture set to acquire a picture feature sequence corresponding to the picture set; performing scene feature extraction on picture feature sub-sequences corresponding to scenes in the picture feature sequence to acquire a scene feature sequence corresponding to the picture set; and generating textual description information of the picture set according to the picture feature sequence and the scene feature sequence that correspond to the picture set.

FIG. 14 is a block diagram of an exemplary computer device suitable for implementing an implementation of this application. A computer device 12 shown in FIG. 14 is only an example, and does not constitute any limitation to the functions and use scope of the embodiments of this application.

As shown in FIG. 14, the computer device 12 is shown in the form of a general-purpose computer device. Components of the computer device 12 may include, but are not limited to, one or more processors or processing units 16, a system memory 28, a bus 18 connecting different system components (including the system memory 28 and the processing unit 16).

The bus 18 indicates one or more of several types of bus structures, including a memory bus or memory controller, a peripheral bus, an accelerated graphics port, a processor or a local bus using any of a variety of bus architectures. For example, such architectures include, but are not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer device 12 typically includes a plurality of computer system-readable media. Such media may be any usable media accessible by the computer device 12, including volatile and non-volatile media and removable and non-removable media.

The system memory 28 may include a computer system-readable medium in the form of a volatile memory such as a random access memory (RAM) 30 and/or a cache memory 32. The computer device 12 may further include another removable/non-removable or volatile/non-volatile computer readable storage medium. In only an example, a storage system 34 may be configured to read from or write to a non-removable, nonvolatile magnetic medium (not shown in FIG. 14, generally referred to as a "hard disk drive"). Although not shown in FIG. 14, a magnetic disk drive that is configured to read data from or write data into a removable, nonvolatile magnetic disk (for example, a floppy disk) and an optical disc drive that reads from or writes to a removable, nonvolatile optical disc (for example, a compact disc read-only memory (CD-ROM), a digital video disc ROM (DVD-ROM) or another optical medium) may be provided. In such cases, each drive can be connected to the bus 18 through one or more data medium interfaces. The memory 28 may include at least one program product having a set of program modules (for example, at least one program module) that are configured to carry out the functions of embodiments of this application.

A program/utility 40, having a set of program modules (at least one program module) 42, may be stored in the memory 28 by way of example. Such program modules 42 include, but are not limited to, an operating system, one or more application programs, another program module, and program data. Each of such examples or some combination thereof may include an implementation of a networking environment. The program module 42 generally performs the function and/or the method of the embodiments described in this application.

The computer device 12 may alternatively communicate with one or more external devices 14 (for example, a keyboard, a pointing device, and a display 24), may alternatively communicate with one or more devices that enable a user to interact with the computer device 12 and/or communicate with any device (for example, a network card, and a modem) that enables the computer device 12 to communicate with one or more other computing devices. Such communication may occur through an I/O interface 22. The computer device 12 may further communicate with one or more networks such as a LAN, a WAN, and/or a public network such as the Internet through a network adapter 20. As shown in FIG. 14, the network adapter 20 communicates with other modules through the bus 18 and the computer device 12. It is to be understood that although not shown in FIG. 14, other hardware and/or software modules may be used in combination with the computer device 12, including, but not limited to, a microcode, a device driver, a redundant processing unit, an external disk drive array, a redundant array of independent disks (RAID) system, a tape drive, a data backup storage system or the like.

The processing unit 16 performs various functional applications and data processing by running the program in the system memory 28, for example, implementing the picture set description generation method according to the embodiment shown in FIG. 1 or the embodiment shown in FIG. 5.

An embodiment further provides a non-transitory computer-readable storage medium, a computer-executable instruction in the storage medium, when being executed by a computer processor, performing the picture set description generation method according to the embodiment shown in FIG. 1 or the embodiment shown in FIG. 5.

An embodiment further provides a computer program product, an instruction in the computer program product, when being executed by the processor, implementing the picture set description generation method according to the embodiment shown in FIG. 1 or the embodiment shown in FIG. 5.

The foregoing non-transitory computer-readable storage medium may adopt any combination of one or more computer-readable media. The computer-readable medium may be a computer-readable signal medium or a computer-readable storage medium. The computer-readable storage medium may be, for example, but is not limited to, an electric, magnetic, optical, electromagnetic, infrared or semiconductor system, apparatus or component, or any combination of the above. In a more specific example (a non-exhaustive list), the non-transitory computer-readable storage medium includes an electrical connection having one or more wires, a portable computer magnetic disk, a hard disk, a RAM, a ROM, an erasable programmable ROM (EPROM) or a flash memory, an optical fiber, a portable CD-ROM, an optical storage medium, a magnetic storage medium or any suitable combination of the above. In this application, the computer-readable storage medium may be any tangible medium containing or storing a program, and the program may be used by or used in combination with an instruction execution system, apparatus or device.

The computer-readable signal medium may include a data signal being in a baseband or propagated as a part of a carrier, the data signal carrying computer-readable program code. The propagated data signal may be in various forms, including, but not limited to, an electromagnetic signal, an optical signal or any suitable combination of the above. The computer-readable signal medium may be alternatively any computer-readable medium other than the computer-readable storage medium. The computer-readable medium may send, propagate or transmit a program for use by or in combination with an instruction execution system, apparatus or device.

The program code contained in the computer-readable medium may be transmitted by using any appropriate medium, including, but not limited to, a wireless medium, a wire, an optical cable, radio frequency (RF), any suitable combination of the above or the like.

One or more programming languages or any combination thereof may be used for writing the computer program code used for performing the operations in this application. The programming languages include, but are not limited to, an object oriented programming language such as Java, Smalltalk, C++ or the like and a conventional procedural programming language, such as the C programming language or a similar programming language. The program code may be executed entirely on a computer of a user, partly on the computer of the user, as a stand-alone software package, partly on the computer of the user and partly on a remote computer, or entirely on the remote computer or a server. In the scenarios related the remote computer, the remote computer may be connected to the computer of the user through any type of network, including a LAN or a WAN, or the connection may be made to an external computer (for example, through the Internet using an internet service provider (ISP)).

In the descriptions of this application, terms "first" and "second" are only used for the purpose of description and cannot be understood as indicating or implying relative importance. In addition, in the description of this application, unless otherwise stated, "a plurality of" means two or more than two.

Any process or method in the flowcharts or described herein in another manner may be understood as indicating a module, a segment, or a part including code of one or more executable instructions for implementing a particular logical function or process step. In addition, the scope of preferred embodiments of this application include other implementations which do not follow the order shown or discussed, including performing, according to involved functions, the functions basically simultaneously or in a reverse order, which is to be understood by technical personnel in the technical field to which the embodiments of this application belong.

It is to be understood that each part of this application may be implemented by using hardware, software, firmware, or combinations thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

A person of ordinary skill in the art may understand that all or some of the steps of the method embodiments may be implemented by a program instructing relevant hardware. The program may be stored in a non-transitory computer-readable storage medium. When the program is run, one or a combination of the steps of the method embodiments are performed.

In addition, functional modules in the embodiments of this application may be integrated into one processing module, or each of the modules may exist alone physically, or two or more modules may be integrated into one module. The integrated module may be implemented in a hardware form, or may be implemented in the form of a software functional module. If implemented in the form of software functional modules and sold or used as an independent product, the integrated module may also be stored in a non-transitory computer-readable storage medium.

The aforementioned non-transitory computer-readable storage medium may be a ROM, a magnetic disk or an optical disc.

In the descriptions of this specification, descriptions using reference terms "an embodiment", "some embodiments", "an example", "a specific example" or "some examples" mean that specific characteristics, structures, materials or features described with reference to the embodiment or example are included in at least one embodiment or example of this application. In this specification, schematic descriptions of the foregoing terms are not necessarily directed to the same embodiment or example. Moreover, the described specific features, structures, materials or characteristics may be combined in any one or more embodiments or examples in an appropriate manner.

Although the embodiments of this application are shown and described above, it can be understood that the foregoing embodiments are exemplary, and cannot be construed as a limitation to this application. Within the scope of this application, a person of ordinary skill in the art may make changes, modifications, replacement, and variations to the foregoing embodiments.

What is claimed is:

1. A method of generating a description for a picture set, performed by a computer device having a processor and memory storing a plurality of programs to be executed by the processor, the method comprising:
   acquiring a picture set to be processed;
   performing picture feature extraction on each picture in the picture set to acquire a picture feature corresponding to the picture, and forming a picture feature sequence corresponding to the picture set by using the picture features corresponding to the picture set;
   comparing any two adjacent picture features in the picture feature sequence corresponding to two adjacent pictures in the picture set to determine whether the adjacent picture features belong to the same scene;
   forming a picture feature sub-sequence corresponding to one scene by using a plurality of consecutive picture features belonging to the same scene;
   performing scene feature extraction on a respective picture feature sub-sequence corresponding to each scene within the picture feature sequence to acquire a scene feature corresponding to the scene, and forming a scene feature sequence corresponding to the picture set by using the scene features corresponding to the scenes; and
   generating textual description information of the picture set according to the picture feature sequence and the scene feature sequence that correspond to the picture set.

2. The method according to claim 1, wherein the generating textual description information of the picture set according to the picture feature sequence and the scene feature sequence that correspond to the picture set comprises:
   fusing the picture feature sequence and the scene feature sequence that correspond to the picture set to obtain a picture set feature sequence corresponding to the picture set;
   inputting each picture set feature in the picture set feature sequence into a decoder to acquire a textual description statement corresponding to the picture set feature; and
   combining the textual description statements corresponding to the picture set features to obtain the textual description information of the picture set.

3. The method according to claim 2, wherein an input of the decoder is the picture set feature, a character outputted by the decoder at a previous moment, and a hidden state of the decoder at the previous moment, and before the inputting each picture set feature in the picture set feature sequence into a decoder to acquire a textual description statement corresponding to the picture set feature, the method further comprises:
   acquiring a textual description statement corresponding to a previous picture set feature of the picture set feature;
   inputting the textual description statement corresponding to the previous picture set feature into a statement editor to acquire a relationship feature; and
   replacing the hidden state of the decoder at the previous moment with the relationship feature.

4. The method according to claim 1, wherein the performing picture feature extraction on each picture in the picture set to acquire a picture feature corresponding to the picture, and forming a picture feature sequence corresponding to the picture set by using the picture features corresponding to the picture set comprises:
   extracting a feature vector corresponding to each picture in the picture set;

inputting the feature vector corresponding to each picture in the picture set into a picture feature model to acquire the picture feature corresponding to the picture; and forming the picture feature sequence corresponding to the picture set by using the picture features corresponding to the picture set.

5. The method according to claim 1, wherein before the performing scene feature extraction on a picture feature sub-sequence corresponding to each scene in the picture feature sequence to acquire a scene feature corresponding to the scene, the method further comprises:

determining, in a case that a picture feature and any picture feature adjacent to the picture feature do not belong to the same scene, the picture feature as a picture feature sub-sequence in one scene.

6. The method according to claim 1, wherein the comparing any two adjacent picture features in the picture feature sequence to determine whether the adjacent picture features belong to the same scene comprises:

inputting a first state of the former first picture feature of the two adjacent picture features and the latter second picture feature into a scene boundary detector to obtain a flag bit corresponding to the second picture feature, the first state of the first picture feature being obtained after the first picture feature is inputted into a scene feature model; and determining, according to the flag bit, whether the two adjacent picture features belong to the same scene.

7. The method according to claim 6, wherein the performing scene feature extraction on a picture feature sub-sequence corresponding to each scene in the picture feature sequence to acquire a scene feature corresponding to the scene, and forming a scene feature sequence corresponding to the picture set by using the scene features corresponding to the scenes comprises:

sequentially inputting picture features in the picture feature sub-sequence corresponding to each scene into the scene feature model to acquire a first state of the last picture feature in the picture feature sub-sequence, an input of the scene feature model being a picture feature and a second state of a previous picture feature of the picture feature, an output of the scene feature model being a first state of the picture feature, the second state of the previous picture feature being a state obtained after the first state of the previous picture feature is adjusted according to a flag bit corresponding to the picture feature; and using the first state of the last picture feature as a scene feature corresponding to the scene.

8. A computer device, comprising a memory, a processor, and a plurality of computer programs stored in the memory that, when executed by the processor, cause the computer device to perform a plurality of operations including:

acquiring a picture set to be processed;

performing picture feature extraction on each picture in the picture set to acquire a picture feature corresponding to the picture, and forming a picture feature sequence corresponding to the picture set by using the picture features corresponding to the picture set;

comparing any two adjacent picture features in the picture feature sequence corresponding to two adjacent pictures in the picture set to determine whether the adjacent picture features belong to the same scene;

forming a picture feature sub-sequence corresponding to one scene by using a plurality of consecutive picture features belonging to the same scene;

performing scene feature extraction on a respective picture feature sub-sequence corresponding to each scene within the picture feature sequence to acquire a scene feature corresponding to the scene, and forming a scene feature sequence corresponding to the picture set by using the scene features corresponding to the scenes; and generating textual description information of the picture set according to the picture feature sequence and the scene feature sequence that correspond to the picture set.

9. The computer device according to claim 8, wherein the generating textual description information of the picture set according to the picture feature sequence and the scene feature sequence that correspond to the picture set comprises:

fusing the picture feature sequence and the scene feature sequence that correspond to the picture set to obtain a picture set feature sequence corresponding to the picture set;

inputting each picture set feature in the picture set feature sequence into a decoder to acquire a textual description statement corresponding to the picture set feature; and combining the textual description statements corresponding to the picture set features to obtain the textual description information of the picture set.

10. The computer device according to claim 9, wherein an input of the decoder is the picture set feature, a character outputted by the decoder at a previous moment, and a hidden state of the decoder at the previous moment, and before the inputting each picture set feature in the picture set feature sequence into a decoder to acquire a textual description statement corresponding to the picture set feature, the plurality of operations further comprise:

acquiring a textual description statement corresponding to a previous picture set feature of the picture set feature;

inputting the textual description statement corresponding to the previous picture set feature into a statement editor to acquire a relationship feature; and replacing the hidden state of the decoder at the previous moment with the relationship feature.

11. The computer device according to claim 8, wherein the performing picture feature extraction on each picture in the picture set to acquire a picture feature corresponding to the picture, and forming a picture feature sequence corresponding to the picture set by using the picture features corresponding to the picture set comprises:

extracting a feature vector corresponding to each picture in the picture set;

inputting the feature vector corresponding to each picture in the picture set into a picture feature model to acquire the picture feature corresponding to the picture; and forming the picture feature sequence corresponding to the picture set by using the picture features corresponding to the picture set.

12. The computer device according to claim 8, wherein the plurality of operations further comprise:

before performing scene feature extraction on a picture feature sub-sequence corresponding to each scene in the picture feature sequence to acquire a scene feature corresponding to the scene;

determining, in a case that a picture feature and any picture feature adjacent to the picture feature do not belong to the same scene, the picture feature as a picture feature sub-sequence in one scene.

13. The computer device according to claim 12, wherein the comparing any two adjacent picture features in the picture feature sequence to determine whether the adjacent picture features belong to the same scene comprises:

inputting a first state of the former first picture feature of the two adjacent picture features and the latter second picture feature into a scene boundary detector to obtain a flag bit corresponding to the second picture feature, the first state of the first picture feature being obtained after the first picture feature is inputted into a scene feature model; and determining, according to the flag bit, whether the two adjacent picture features belong to the same scene.

14. The computer device according to claim 13, wherein the performing scene feature extraction on a picture feature sub-sequence corresponding to each scene in the picture feature sequence to acquire a scene feature corresponding to the scene, and forming a scene feature sequence corresponding to the picture set by using the scene features corresponding to the scenes comprises:

sequentially inputting picture features in the picture feature sub-sequence corresponding to each scene into the scene feature model to acquire a first state of the last picture feature in the picture feature sub-sequence, an input of the scene feature model being a picture feature and a second state of a previous picture feature of the picture feature, an output of the scene feature model being a first state of the picture feature, the second state of the previous picture feature being a state obtained after the first state of the previous picture feature is adjusted according to a flag bit corresponding to the picture feature; and using the first state of the last picture feature as a scene feature corresponding to the scene.

15. A non-transitory computer-readable storage medium, storing a plurality of processor-executable instructions, the instructions, when executed by one or more processors of a computer device, causing the computer device to perform a plurality of operations including:

acquiring a picture set to be processed;

performing picture feature extraction on each picture in the picture set to acquire a picture feature corresponding to the picture, and forming a picture feature sequence corresponding to the picture set by using the picture features corresponding to the picture set;

comparing any two adjacent picture features in the picture feature sequence corresponding to two adjacent pictures in the picture set to determine whether the adjacent picture features belong to the same scene;

forming a picture feature sub-sequence corresponding to one scene by using a plurality of consecutive picture features belonging to the same scene;

performing scene feature extraction on a respective picture feature sub-sequence corresponding to each scene within the picture feature sequence to acquire a scene feature corresponding to the scene, and forming a scene feature sequence corresponding to the picture set by using the scene features corresponding to the scenes; and generating textual description information of the picture set according to the picture feature sequence and the scene feature sequence that correspond to the picture set.

16. The non-transitory computer-readable storage medium according to claim 15, wherein the generating textual description information of the picture set according to the picture feature sequence and the scene feature sequence that correspond to the picture set comprises:

fusing the picture feature sequence and the scene feature sequence that correspond to the picture set to obtain a picture set feature sequence corresponding to the picture set;

inputting each picture set feature in the picture set feature sequence into a decoder to acquire a textual description statement corresponding to the picture set feature; and combining the textual description statements corresponding to the picture set features to obtain the textual description information of the picture set.

17. The non-transitory computer-readable storage medium according to claim 16, wherein an input of the decoder is the picture set feature, a character outputted by the decoder at a previous moment, and a hidden state of the decoder at the previous moment, and before the inputting each picture set feature in the picture set feature sequence into a decoder to acquire a textual description statement corresponding to the picture set feature, the plurality of operations further comprise:

acquiring a textual description statement corresponding to a previous picture set feature of the picture set feature;

inputting the textual description statement corresponding to the previous picture set feature into a statement editor to acquire a relationship feature; and replacing the hidden state of the decoder at the previous moment with the relationship feature.

18. The non-transitory computer-readable storage medium according to claim 15, wherein the performing picture feature extraction on each picture in the picture set to acquire a picture feature corresponding to the picture, and forming a picture feature sequence corresponding to the picture set by using the picture features corresponding to the picture set comprises:

extracting a feature vector corresponding to each picture in the picture set;

inputting the feature vector corresponding to each picture in the picture set into a picture feature model to acquire the picture feature corresponding to the picture; and forming the picture feature sequence corresponding to the picture set by using the picture features corresponding to the picture set.

19. The non-transitory computer-readable storage medium according to claim 15, wherein the plurality of operations further comprise:

before performing scene feature extraction on a picture feature sub-sequence corresponding to each scene in the picture feature sequence to acquire a scene feature corresponding to the scene;

determining, in a case that a picture feature and any picture feature adjacent to the picture feature do not belong to the same scene, the picture feature as a picture feature sub-sequence in one scene.

20. The non-transitory computer-readable storage medium according to claim 19, wherein the comparing any two adjacent picture features in the picture feature sequence to determine whether the adjacent picture features belong to the same scene comprises:

inputting a first state of the former first picture feature of the two adjacent picture features and the latter second picture feature into a scene boundary detector to obtain a flag bit corresponding to the second picture feature, the first state of the first picture feature being obtained after the first picture feature is inputted into a scene feature model; and determining, according to the flag bit, whether the two adjacent picture features belong to the same scene.

\* \* \* \* \*